US009503671B2

(12) United States Patent
Jang et al.

(10) Patent No.: US 9,503,671 B2
(45) Date of Patent: Nov. 22, 2016

(54) DISPLAY DEVICE

(71) Applicant: Samsung Display Co. Ltd., Yongin, Gyeonggi-Do (KR)

(72) Inventors: Eui Yun Jang, Seoul (KR); Na Young Shin, Hwaseong-si (KR); Yun Jang, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 98 days.

(21) Appl. No.: 14/508,855

(22) Filed: Oct. 7, 2014

(65) Prior Publication Data

US 2015/0366082 A1 Dec. 17, 2015

(30) Foreign Application Priority Data

Jun. 13, 2014 (KR) .................. 10-2014-0072137

(51) Int. Cl.
| | | |
|---|---|---|
| *G06F 1/16* | (2006.01) | |
| *H04N 5/64* | (2006.01) | |
| *G02F 1/1333* | (2006.01) | |

(52) U.S. Cl.
CPC .......... *H04N 5/64* (2013.01); *G02F 1/133308* (2013.01); *G06F 1/16* (2013.01); *G02F 1/13336* (2013.01); *G02F 2001/133314* (2013.01); *G02F 2201/50* (2013.01); *G02F 2202/28* (2013.01)

(58) Field of Classification Search
CPC ............................ H05K 5/0017; G06F 1/1601
See application file for complete search history.

(56) References Cited

U.S. PATENT DOCUMENTS

| | | | | |
|---|---|---|---|---|
| 8,369,107 B2* | 2/2013 | Cho | ............ | H01L 51/5237 174/259 |
| 8,611,077 B2* | 12/2013 | Sanford | ............ | G06F 1/1626 361/679.21 |
| 2009/0225506 A1* | 9/2009 | Lee | ............ | H05K 5/0017 361/679.21 |
| 2011/0222218 A1* | 9/2011 | Kim | ............ | H04N 5/65 361/679.01 |
| 2013/0003268 A1* | 1/2013 | Cheon | ............ | H05K 5/02 361/679.01 |
| 2013/0050820 A1* | 2/2013 | Shin | ............ | G06F 1/1601 359/465 |
| 2013/0221812 A1* | 8/2013 | Hashimoto | ............ | H05K 5/0004 312/7.2 |

(Continued)

FOREIGN PATENT DOCUMENTS

| KR | 10-2011-0119360 | 11/2011 |
|---|---|---|
| KR | 10-2012-0118372 | 10/2012 |

(Continued)

*Primary Examiner* — Anthony Q Edwards
(74) *Attorney, Agent, or Firm* — Innovation Counsel LLP

(57) ABSTRACT

Provided is a display device. The display device includes: a display panel which displays an image; and a housing which supports the display panel, wherein the housing includes: a bottom plate which includes edge regions; and a plurality of sidewalls which are located on the edge regions of the bottom plate and face the display panel, wherein the plurality of sidewalls include a first region and a second region adjacent to the first region and overlap an edge portion of the display panel, and an average height of at least one of the sidewalls on the first region is greater than an average height of at least one of the sidewalls on the second region.

19 Claims, 17 Drawing Sheets

(56) References Cited

U.S. PATENT DOCUMENTS

2014/0063707 A1\* 3/2014 Itaya .................. G06F 1/1601
361/679.01

FOREIGN PATENT DOCUMENTS

| KR | 10-2013-0046240 | 5/2013 |
| KR | 10-2013-0098635 | 9/2013 |
| KR | 10-2013-0115417 | 10/2013 |

\* cited by examiner

DISPLAY DEVICE

This application claims priority to Korean Patent Application No. 10-2014-0072137 filed on Jun. 13, 2014 in the Korean Intellectual Property Office, the disclosure of which is incorporated herein by reference in its entirety.

BACKGROUND

1. Field

The inventive concept relates to a display device.

2. Description of the Related Art

Display devices are devices that visually display image. Examples of the display devices include liquid crystal displays, electrophoretic displays, organic light-emitting displays, inorganic electroluminescent (EL) displays, field emission displays, surface-conduction electron-emitter displays, plasma displays, and cathode ray displays.

External factors of a display device as well as internal factors (e.g., image quality, response speed, contrast ratio, etc.) are being recognized as factors contributing to the value of a product. In particular, it is required to minimize a region (i.e., a non-display region) in which no image is displayed in order to increase the value of the product.

SUMMARY

Aspects of the inventive concept provide a display device having a minimized non-display region and improved durability.

However, aspects of the inventive concept are not restricted to the one set forth herein. The above and other aspects of the inventive concept will become more apparent to one of ordinary skill in the art to which the inventive concept pertains by referencing the detailed description of the inventive concept given below.

According to an aspect of the inventive concept, there is provided a display device including: a display panel which displays an image; and a housing which supports the display panel, wherein the housing includes: a bottom plate which includes an edge region having a first region and a second region adjacent to the first region; and a plurality of sidewalls which are located on the edge region of the bottom plate and face the display panel, wherein the sidewalls overlap an edge portion of the display panel, and an average height of at least one of the sidewalls on the first region is greater than an average height of at least one of the sidewalls on the second region.

An end of each of the sidewalls may include at least one of a step, a groove, and a slope.

The display device may further include an adhesive which is interposed between the display panel and the sidewalls, wherein the adhesive overlaps the edge portion of the display panel.

The adhesive may have a photocurable or thermosetting property.

The adhesive may extend covers at least part of side surfaces of the display panel.

The adhesive may extend from the side surfaces of the display panel to cover at least part of a top surface of the display panel.

The first region may be located in an inner portion of the edge region, and the second region may be located in an outer portion of the edge region.

A surface of the bottom plate which faces the display panel may be rectangular, and the second region may be located on portions of the edge region which correspond to two short sides of the surface of the bottom plate.

A surface of the bottom plate which faces the display panel may be rectangular, and a ratio of the second region to the first region in the edge region may increase as a distance from a virtual line that halves two long sides of the bottom plate increases.

The display device may further include a light source which provides light to the display panel, wherein the light source is accommodated in the housing.

The display panel may include a light-blocking layer which blocks light, and wherein the light-blocking layer is located on the edge portion of the display panel which overlaps the sidewalls.

The display panel may include a first substrate, a second substrate which faces the first substrate, and a sealant which is interposed between edges of the first substrate and edges of the second substrates, wherein the sidewalls overlap the sealant.

A side surface of the display panel and an outer surface of one of the sidewalls which corresponds to the side surface of the display panel may lie in the same plane.

According to another aspect of the inventive concept, there is provided a display device including: a display panel which displays an image; and a housing which supports the display panel, wherein the housing includes: a bottom plate which includes an edge region; and a plurality of sidewalls which are located on the edge region of the bottom plate and faces the display panel, and wherein the sidewalls overlap an edge portion of the display panel, and an end of each of the sidewalls includes at least one of a step, a groove, and a slope.

The edge region may include a first region and a second region adjacent to the first region, and an average height of at least one of the sidewalls on the first region may be greater than an average height of at least one of the sidewalls on the second region.

The first region may be located in an inner portion of the edge region, and the second region may be located in an outer portion of the edge region.

The display device may further include an adhesive which is interposed between the display panel and the sidewalls, wherein the adhesive overlaps the edge portion of the display panel.

According to another aspect of the inventive concept, there is provided a display device including: a display panel which displays an image; a housing which includes a bottom plate located under the display panel and a plurality of sidewalls extending from an edge portion of the bottom plate toward the display panel; and an adhesive which is interposed between the display panel and the sidewalls, wherein the adhesive covers at least part of side surfaces of the display panel.

An end of each of the sidewalls may include at least one of a step, a groove, and a slope.

The adhesive may extend from the side surfaces of the display panel to cover at least part of a top surface of the display panel.

BRIEF DESCRIPTION OF THE DRAWINGS

The above and other aspects and features of the inventive concept will become more apparent by describing in detail exemplary embodiments thereof with reference to the attached drawings, in which.

DETAILED DESCRIPTION

Advantages and features of the inventive concept and methods of accomplishing the same may be understood more readily by reference to the following detailed description of exemplary embodiments and the accompanying drawings. The inventive concept may, however, be embodied in many different forms and should not be construed as being limited to the embodiments set forth herein. Rather, these embodiments are provided so that this disclosure will be thorough and complete and will fully convey the concept of the invention to those skilled in the art, and the inventive concept will only be defined by the appended claims.

It will be understood that when an element or layer is referred to as being "on" another element or layer, the element or layer can be directly on another element or layer or intervening elements or layers can be existed between elements or layers. Like numbers refer to like elements throughout the specification.

It will be understood that, although the terms first, second, third, etc., may be used herein to describe various components, these components should not be limited by these terms. These terms are only used to distinguish one component from another component. Thus, a first component discussed below could be termed a second component without departing from the teachings of the inventive concept.

A display device is a device that displays an image. The display device may be a liquid crystal display, an electrophoretic display, an organic light-emitting display, an inorganic electroluminescent display, a field emission display, a surface-conduction electron-emitter display, a plasma display, a cathode ray display, etc.

A liquid crystal display will hereinafter be described as an example of a display device according to an embodiment of the inventive concept. However, a display device according to the inventive concept is not limited to the liquid crystal display, and various types of display devices can be used.

Hereinafter, embodiments of the inventive concept will be described with reference to the attached drawings.

Figure 1:
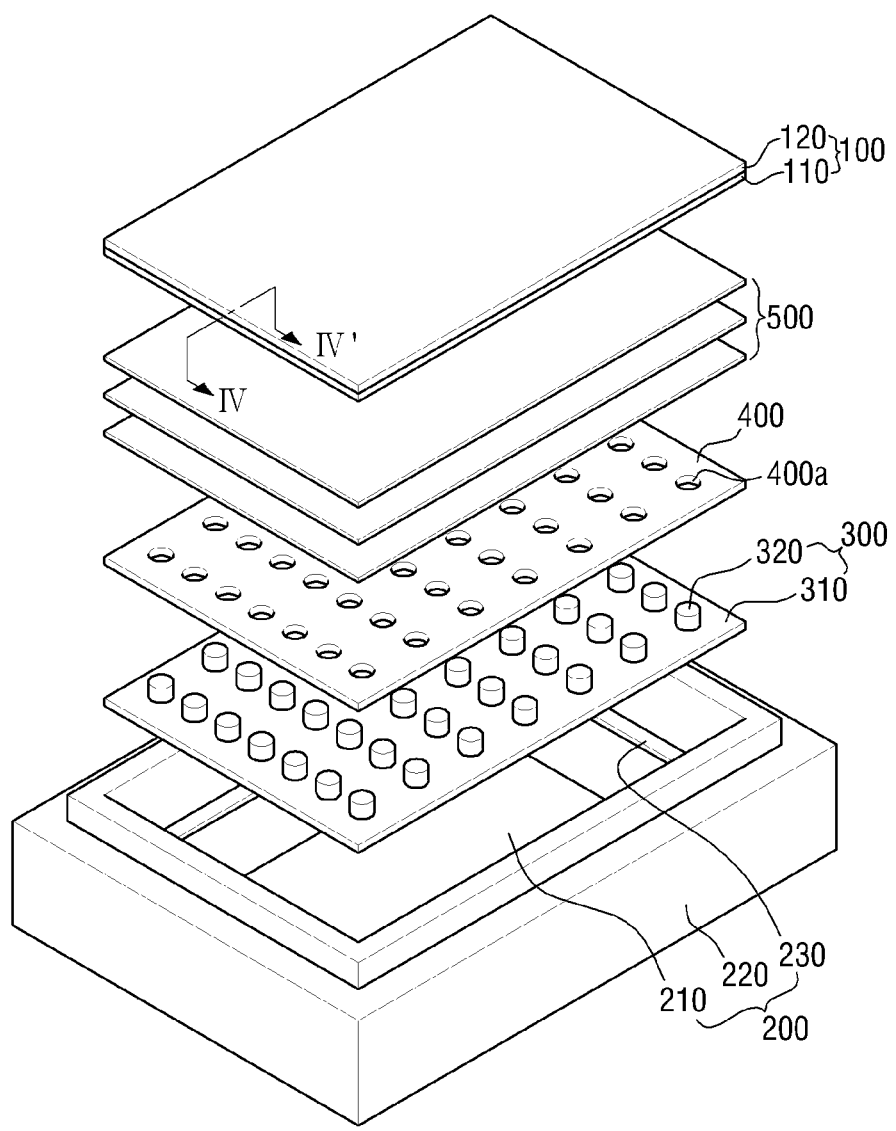
FIG. 1 is an exploded perspective view of a display device according to an embodiment of the inventive concept.

FIG. 1 is an exploded perspective view of a display device according to an embodiment of the inventive concept. Referring to FIG. 1, the display device according to the current embodiment includes a display panel 100 and a housing 200. The display device according to the current embodiment may further include a light source unit 300, a reflective plate 400, and an optical sheet 500.

The display panel 100 may include a display region in which an image is displayed and a non-display region in which no image is displayed. The display region may be surrounded by the non-display area. In addition, the display region may correspond to a central region C (see FIGS. 2 through 5) of a bottom plate 210 of the housing 200, and the non-display region may correspond to an edge region E (see FIGS. 2 through 5) of the bottom plate 210 of the housing 200. Hereinafter, a portion corresponding to the display region of the display panel 100 will be referred to as a central portion of the display panel 100, and a portion corresponding to the non-display region of the display panel 100 will be referred to as an edge portion of the display panel 100.

The display panel 100 may include a first substrate 110, a second substrate 120 facing the first substrate 110, and a liquid crystal layer (not illustrated) interposed between the first substrate 110 and the second substrate 120.

Each of the first substrate 110 and the second substrate 120 may be shaped like a rectangular parallelepiped. In FIG. 1, the first substrate 110 and the second substrate 120 shaped like rectangular parallelepipeds are illustrated for ease of description. However, the inventive concept is not limited thereto, and the first substrate 110 and the second substrate 120 may be formed in various shapes according to the shape of the display panel 100. The liquid crystal layer may be interposed between the first substrate 110 and the second substrate 120.

A sealing member such as a sealant Se (see FIGS. 4 and 5) may be placed between the first substrate 110 and the second substrate 120 along edges of each of the first and second substrates 110 and 120, thereby bonding the first substrate 110 and the second substrate 120 together. That is, the sealant Se may be placed on the edge portion of the display panel 100. In addition, a light-blocking layer such as a black matrix BM (see FIGS. 4 and 5) may be placed between the first substrate 110 and the second substrate 120 along the edges of each of the first and second substrates 110 and 120, thereby blocking light incident upon the edges of each of the first substrate 110 and the second substrate 120. That is, the black matrix BM may be placed on the edge portion of the display panel 100. In addition, at least part of the black matrix BM may overlap the sealant Se.

Although not illustrated in the drawing, the display panel 100 may include a driver and a flexible printed circuit board (FPCB) attached to the first substrate 110 or the second substrate 120. The driver may output various signals (such as a driving signal) required to display an image on the display region. The FPCB may output various signals to the driver.

Figure 2:
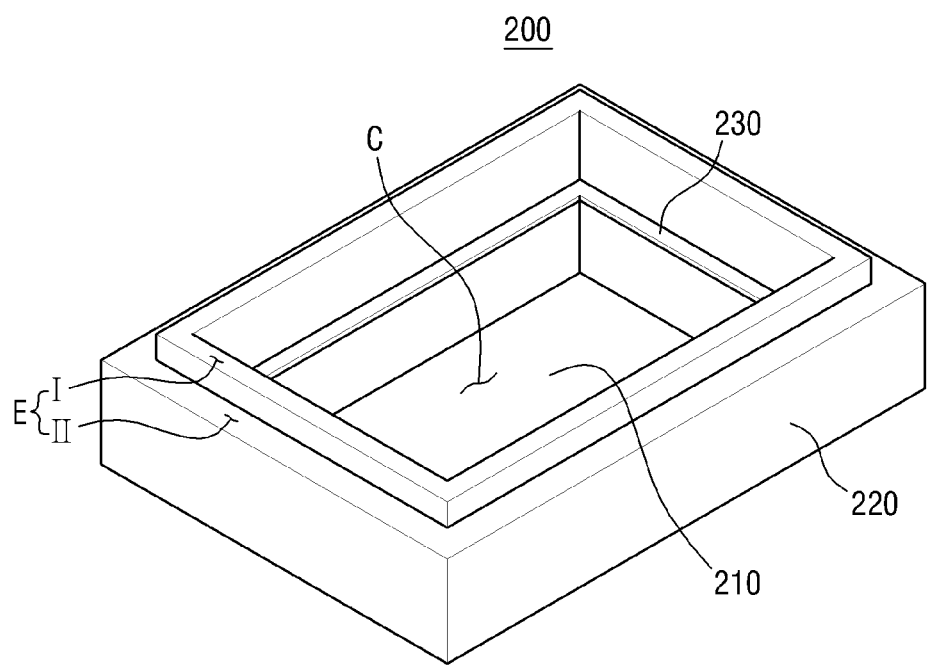
FIG. 2 is a perspective view of a housing included in the display device of FIG. 1.
Figure 3:
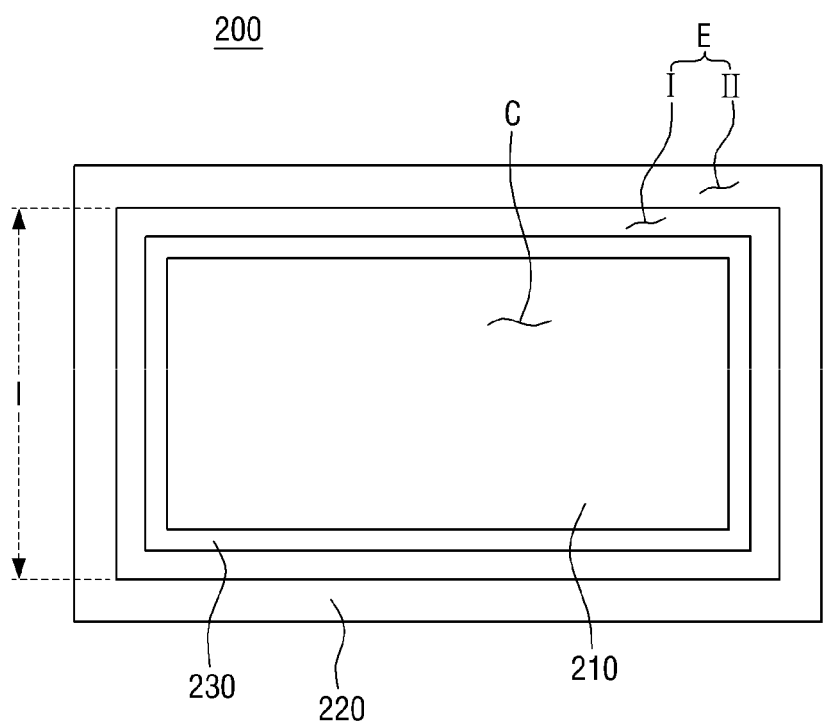
FIG. 3 is a plan view of the housing of FIG. 2.

The housing 200 may be disposed under the display panel 100. The housing 200 may accommodate the light source unit 300, the reflective plate 400, and the optical sheet 500 while supporting the display panel 100. The housing 200 will now be described in detail with reference to FIGS. 2 and 3. FIG. 2 is a perspective view of the housing 200 included in the display device of FIG. 1. FIG. 3 is a plan view of the housing 200 of FIG. 2.

Referring to FIGS. 2 and 3, the housing 200 may include the bottom plate 210, a plurality of sidewalls 220, and a sheet support 230.

The bottom plate 210 may face the display panel 100. A surface of the bottom plate 210 facing the display panel 100 may be rectangular. The bottom plate 210 may include the central region C and the edge region E. The central region C may be located in a central portion of the bottom plate 210 and, as described above, correspond to the display region of the display panel 100. The edge region E may be located in an edge portion of the bottom plate 210 and, as described above, correspond to the non-display region of the display panel 100.

The edge region E of the bottom plate 210 may include a first region I and a second region II adjacent to the first region I. The first region I may be located in an inner portion of the edge region E, and the second region II may be located in an outer portion of the edge region E. In an exemplary embodiment, the first region I may be surrounded by the second region II. In other words, the first region I may be interposed between the central region C and the second region II.

The sidewalls 220 may be located on the edge region E of the bottom plate 210. That is, all of the sidewalls 220 may exist on the first region I and the second region II. The sidewalls 220 may be formed integrally with the bottom plate 210. The sidewalls 220 may be formed of the same material as the bottom plate 210. Specifically, the sidewalls 220 may extend from the edge portion of the bottom plate 210 toward the display panel 100. That is, the sidewalls 220 may face the display panel 100. In an exemplary embodiment, if a surface of the bottom plate 210 facing the display panel 100 is rectangular, four sidewalls 220 may be provided. The sidewalls 220 will be described in greater detail later.

The sheet support 230 may be located on inner surfaces of the sidewalls 220. Specifically, the sheet support 230 may protrude from the inner surfaces of the sidewalls 220 in a direction perpendicular to the inner surfaces of the sidewalls 220. In an exemplary embodiment, the sheet support 230 may be formed integrally with the sidewalls 220. The sheet support 230 may be formed of the same material as the sidewalls 220. The sheet support 230 may support the optical sheet 500.

Referring back to FIG. 1, the light source unit 300 may be located on the bottom plate 210. The display device according to the current embodiment may use a direct-type backlight assembly. Accordingly, the light source unit 300 may overlap the display panel 100. The light source unit 300 may provide light to the display panel 100. However, the light source unit may be located on one or more sidewalls 220 of the housing 200.

The light source unit 300 may include a circuit board 310 and a plurality of light sources 320.

The circuit board 310 may be interposed between the bottom plate 210 and the reflective plate 400 to support the light sources 320 and supply power and various signals to the light sources 320. The circuit board 310 may be shaped like a rectangular parallelepiped plate. In addition, the circuit board 310 may be connected to the FPCB so as to receive, e.g., a dimming signal from the driver.

The light sources 320 may be mounted on the circuit board 310. The light sources 320 may generate light when receiving power from an external source. The light sources 320 may lie in the same plane. Each of the light sources 320 may be a light-emitting diode (LED). However, the inventive concept is not limited thereto, and each of the light sources 320 may be any element that can emit light. In an exemplary embodiment, the light sources 320 may be arranged in a matrix pattern. However, the inventive concept is not limited thereto, and the arrangement pattern of the light sources 320 can vary according to the shape of the display panel 100.

The reflective plate 400 may be disposed on the light source unit 300. Specifically, the reflective plate 400 may be interposed between the light source unit 300 and the optical sheet 500. The reflective plate 400 may change the path of light emitted from the light source unit 300 and travelling toward the bottom plate 210 in a direction toward the optical sheet 500.

The reflective plate 400 may include a plurality of insertion holes 400a. The insertion holes 400a may correspond to the light sources 320, respectively. That is, the light sources 320 may be inserted into the insertion holes 400a, respectively.

The optical sheet 500 may be disposed on the reflective plate 400. Specifically, the optical sheet 500 may be interposed between the display panel 100 and the reflective plate 400. The optical sheet 500 may modulate optical characteristics of light emitted from the light source unit 300. The optical sheet 500 may be provided in a plurality. The optical sheets 500 may have different functions. The optical sheets 500 may be stacked to overlap each other and complement each other. For example, the optical sheets 500 may include a diffuser and a prism sheet.

Figure 4:
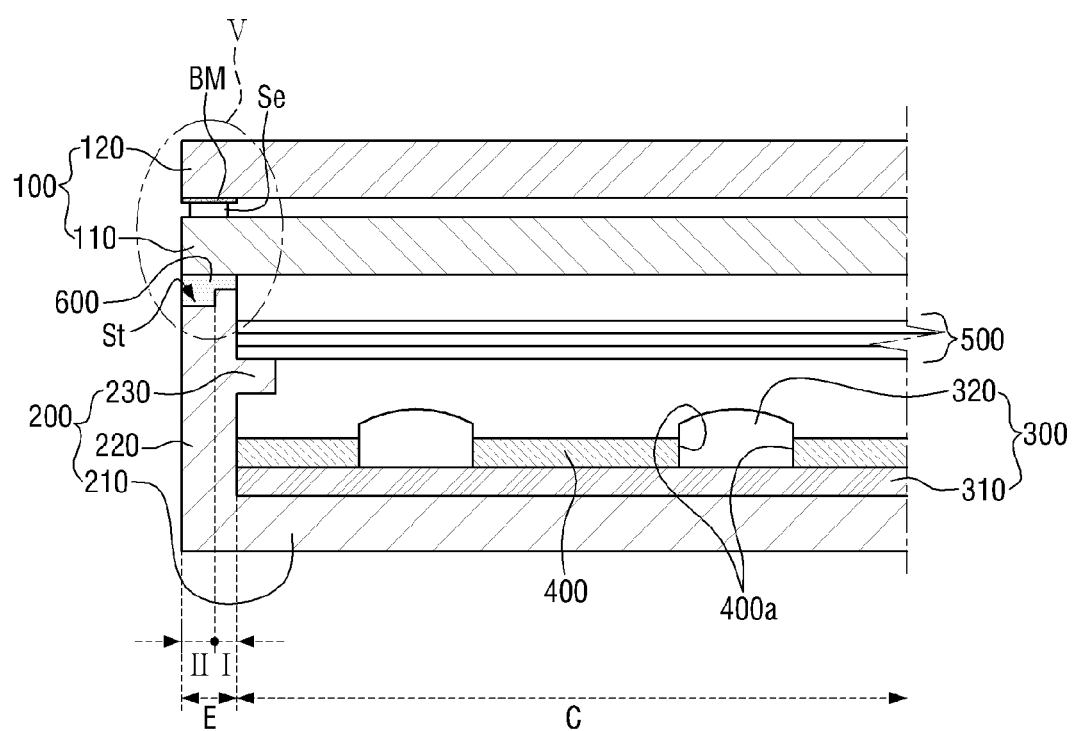
FIG. 4 is a cross-sectional view taken along the line IV-IV' of FIG. 1.
Figure 5:
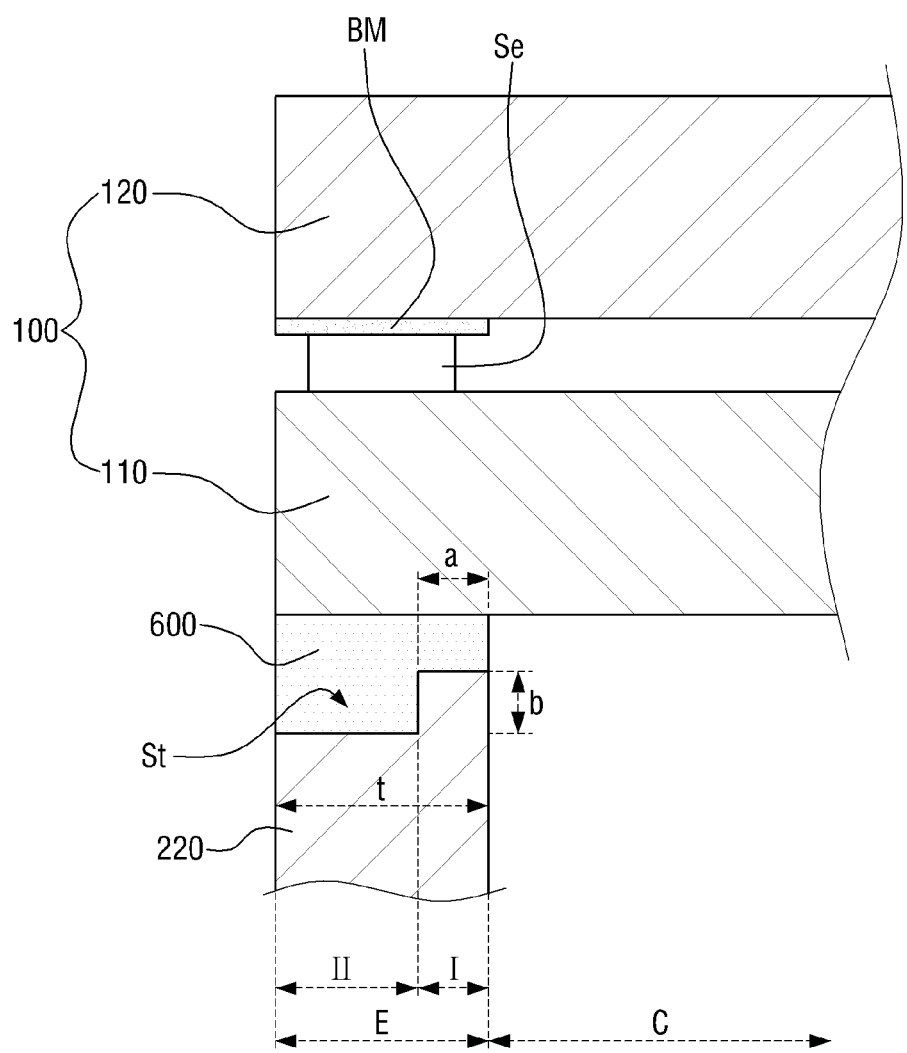
FIG. 5 is an enlarged cross-sectional view of a portion V of FIG. 4.

The stack structure of the display device according to the current embodiment will now be described in greater detail with reference to FIGS. 4 and 5. FIG. 4 is a cross-sectional view taken along the line IV-IV' of FIG. 1. FIG. 5 is an enlarged cross-sectional view of a portion V of FIG. 4.

Referring to FIGS. 4 and 5, the sidewalls 220 may overlap the edge portion of the display panel 100. That is, the sidewalls 220 may overlap at least one of the black matrix BM and the sealant Se located on the non-display region of the display panel 100. In an exemplary embodiment, a width t of one of the sidewalls 220 may be equal to or smaller than a width of the black matrix BM. In addition, a side surface of the display panel 100 and an outer surface of one of the sidewalls 220 which corresponds to the surface of the display panel 100 may lie in the same plane.

An average height of at least one of the sidewalls 220 on the first region I may be greater than an average height of at least one of the sidewalls 220 on the second region II. In an exemplary embodiment, an end of each of the sidewalls 220 may include a step St. Referring to FIG. 5, a width and a height of a protrusion of the step St formed at the end of each of the sidewalls 220 may be a and b, respectively.

The display device according to the current embodiment may further include an adhesive 600 interposed between the display panel 100 and the sidewalls 220. The adhesive 600 may overlap the edge portion of the display panel 100. The adhesive 600 may be interposed between the display panel 100 and the sidewalls 220 to bond the display panel 100 and the sidewalls 220 together. That is, the adhesive 600 may fix the display panel 100 to the housing 200. In other words, the adhesive 600 may restrict movements of the display panel 100 along 3-axis and fix the display panel 100 to the housing 200 firmly.

The adhesive 600 may have a photo-curable property in order to reduce the curing time. However, the inventive concept is not limited thereto, and the adhesive 600 may have a thermosetting property. In addition, the adhesive 600 may be transparent.

The adhesive 600 may have a shape corresponding to the shape of the end of each of the sidewalls 220. In an exemplary embodiment, an average thickness of the adhesive 600 on the first region I may be smaller than an average thickness of the adhesive 600 on the second region II.

As described above, in the display device according to the current embodiment of the inventive concept, the display panel 100 is placed on the sidewalls 220 of the housing 200, and the display panel 100 and the sidewalls 220 are fixed each other by the adhesive 600. Accordingly, the non-display region of the display panel 100 can be minimized That is, the display region of the display device according to the current embodiment may be larger than that of another display device of the same size. In addition, since a top chassis is not used, manufacturing costs can be reduced, and a slim and ultra-light display device can be realized. If a tiled LCD is manufactured using the display device as described above, a boundary line between adjacent display devices may be hardly seen. That is, a more natural image can be displayed on a tiled LCD formed by connecting a plurality of display devices.

Furthermore, the durability of the display device can be improved by patterning the end of each of the sidewalls 220. Specifically, a contact area between the adhesive 600 and the sidewalls 220 can be increased by forming the step St at the end of each of the sidewalls 220. The increased contact area between the adhesive 600 and the sidewalls 220 can increase the adhesion of the display panel 100 to the sidewalls 220. For example, if the end of each of the sidewalls 220 is flat without having the step St, the contact area between the adhesive 600 to a sidewall 220 corresponding to a short side of the bottom plate 210 may be t×1 (see FIGS. 3 and 5). However, if the step St is formed at the end of each of the sidewalls 220 as in the current embodiment, the contact area between the adhesive 600 and a sidewall 220 corresponding to a short side of the bottom plate 210 may be (t+b)×1. That is, the step St formed at the end of each of the sidewalls 220 may increase the contact area between the adhesive 600 and a sidewall 220 corresponding to a short side of the bottom plate 210 by b×1.

In this case, the second moment of inertia of the sidewalls 220 may be reduced, resulting in a reduction in bending stiffness. In addition, the reduced bending stiffness may increase the amount of bending deformation ($\propto b^2/a^3$). Therefore, if the contact area is increased, a and b may be determined in view of the mechanical deformation of the sidewalls 220.

FIGS. 6 through 12 are enlarged cross-sectional views of respective portions of display devices according to other embodiments of the inventive concept which correspond to the portion V of FIG. 4. For simplicity, elements substantially identical to those of the above-described drawings are indicated by like reference numerals, and thus a redundant description thereof will be omitted.

Figure 6:
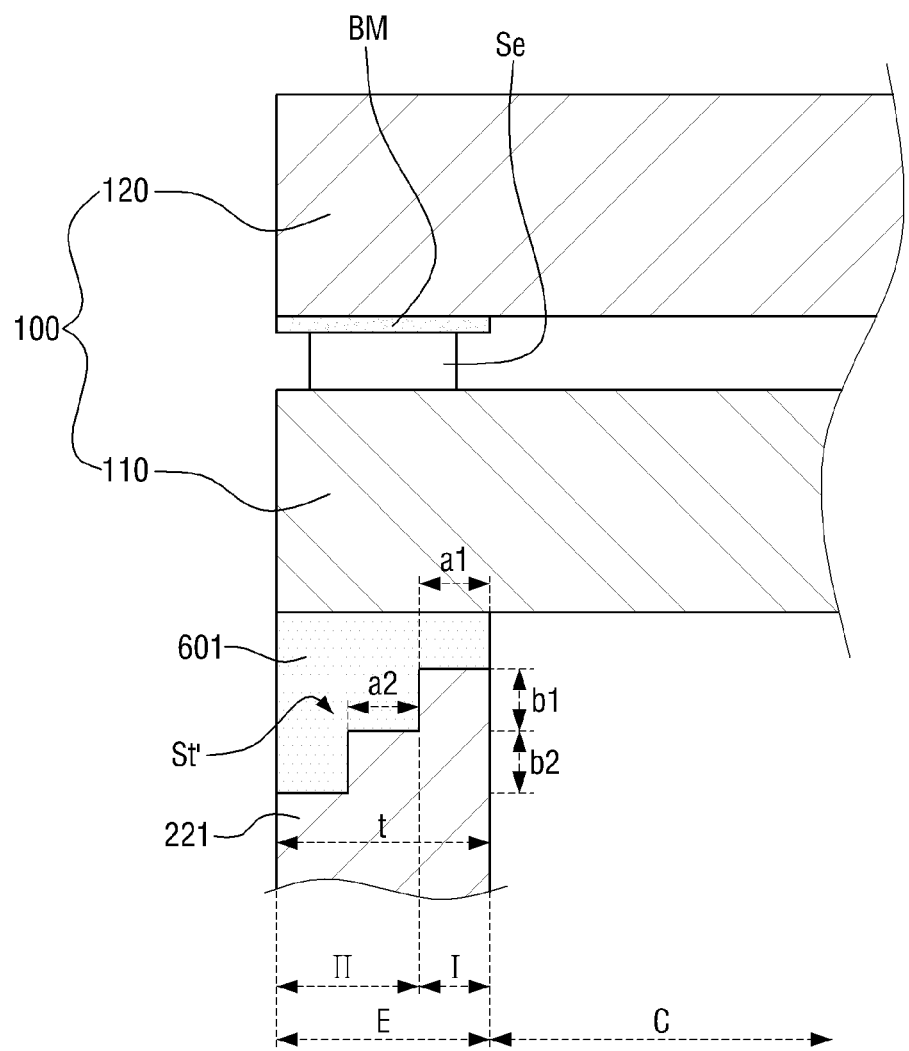
FIGS. 6 through 12 are enlarged cross-sectional views of respective portions of display devices according to other embodiments of the inventive concept which correspond to the portion V of FIG. 4.

Referring to FIG. 6, an end of each of a plurality of sidewalls 221 may include a plurality of steps St'. In other words, the end of each of the sidewalls 221 may have a multi-step structure. Here, a first region I may be a region where a rightmost protrusion is located, and a second region II may be a region where the rightmost protrusion is not located. In FIG. 6, a width and a height of the rightmost protrusion may be a1 and b1, respectively, and a width and a height of a middle protrusion may be a2 and b2, respectively. In this case, a contact area between an adhesive 601 and a sidewall 221 corresponding to a short side of a bottom plate 210 may be increased by (b1+b2)×1. Here, since a1, b1, a2 and b2 are bending deformation factors, they may be determined in view of the mechanical deformation of the sidewalls 221. The adhesive 601 may have a shape corresponding to the shape of the end of each of the sidewalls 221.

Figure 7:
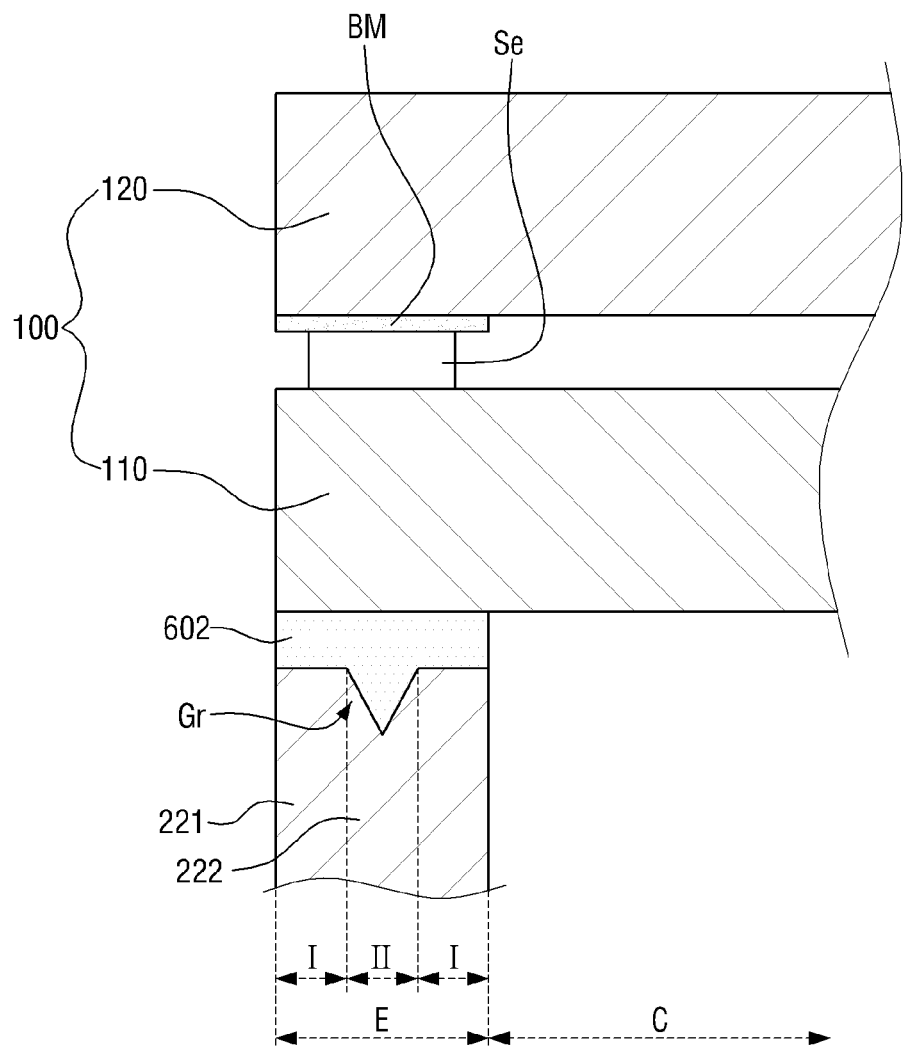

Referring to FIG. 7, an end of each of a plurality of sidewalls 222 may include a groove Gr. Here, a first region I may be a region where the groove Gr is not located, and a second region II may be a region where the groove Gr is located. An adhesive 602 may have a shape corresponding to the shape of the end of each of the sidewalls 222. In this embodiment, the shape of groove is "V". However, those skilled in the art will appreciate that various modifications and applications are possible. For example, the shape of groove is not limited to V-groove but includes U-groove, stepped groove, etc.

Figure 8:
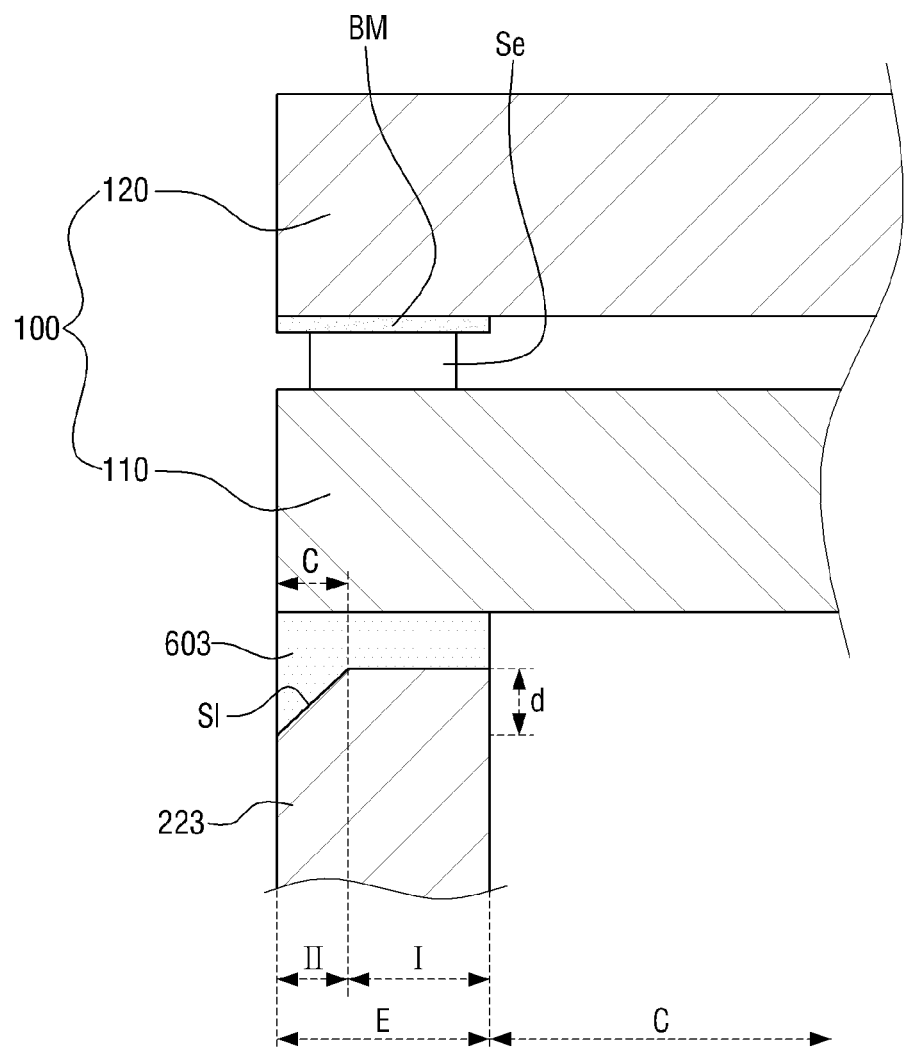

Referring to FIG. 8, an end of each of a plurality of sidewalls 223 may include a slope S1. Here a first region I may be region where the slope S1 is not located, and a second region II may be a region where the slope S1 is located. In FIG. 8, a width and a height of the slope S1 may be c and d, respectively. In this case, a contact area between an adhesive 603 and a sidewall 223 corresponding to a short side of a bottom plate 210 may be increased by $\{(c^2+d^2)^{1/2}-c\}\times 1$. Here, since c and d are bending deformation factors, they may be determined in view of the mechanical deformation of the sidewalls 223. The adhesive 603 may have a shape corresponding to the shape of the end of each of the sidewalls 223.

Figure 9:
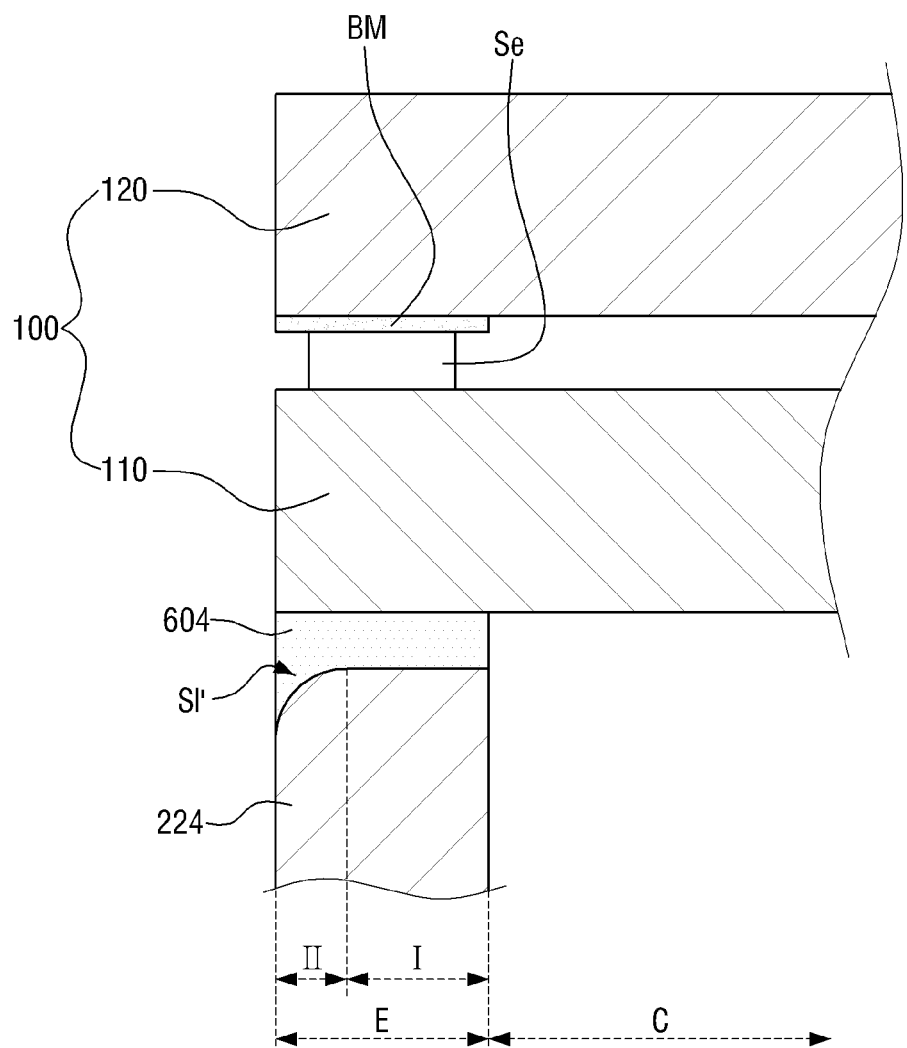

Referring to FIG. 9, an end of each of a plurality of sidewalls 224 may include a slope S1'. The slope S1' of FIG. 9 may have a curved surface. Here, a first region I may be a region where the slope S1' is not located, and a second region II may be a region where the slope S1' is located. An adhesive 604 may have a shape corresponding to the shape of the end of each of the sidewalls 224.

Figure 10:
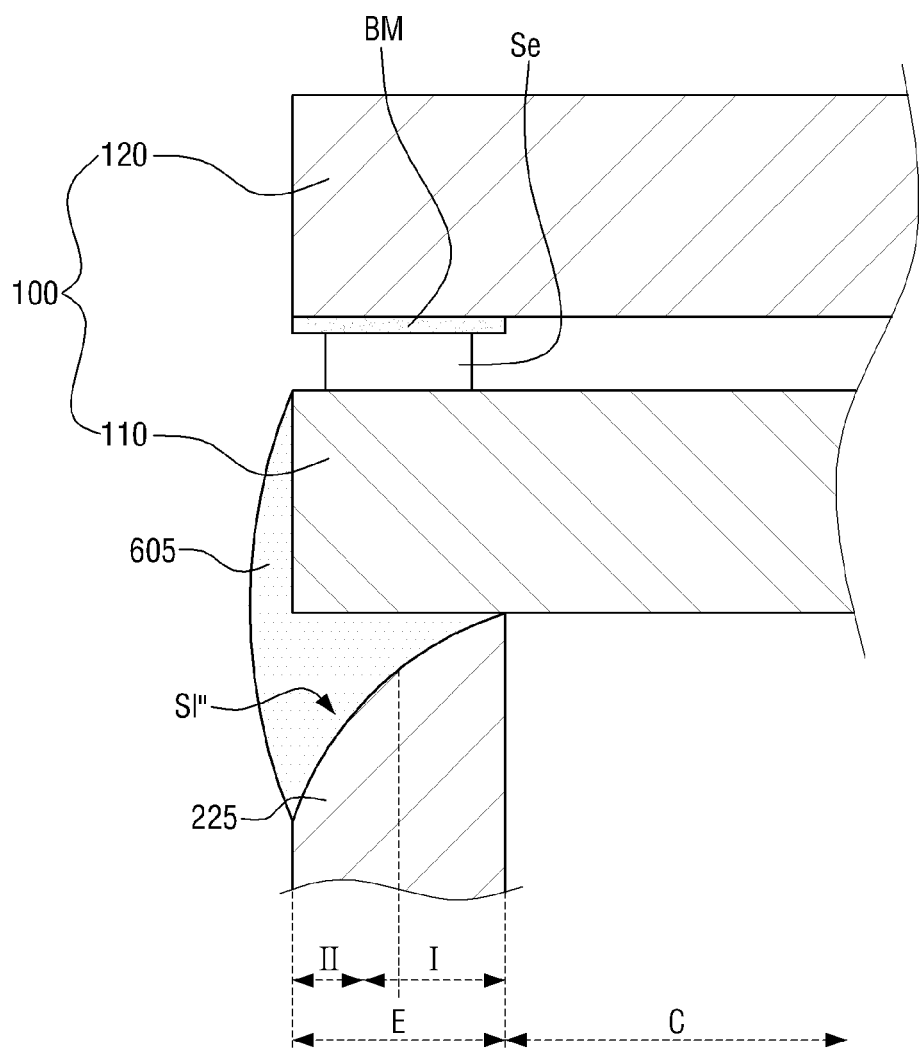

Referring to FIG. 10, an end of each of a plurality of sidewalls 225 may include a slope SI". The slope SI" of FIG. 10 may have a curved surface. In an exemplary embodiment, a height of each of the sidewalls 225 may increase toward the inside of the display device. In this case, at least part of each of the sidewalls 225 may directly contact a display panel 100. For example, an inner surface of each of the sidewalls 225 may directly contact the display panel 100. Here, a first region I may be an inner portion of the slope SI", and a second region II may be an outer portion of the slope SI".

An adhesive 605 may extend from between the display panel 100 and the sidewalls 225 to cover at least part of side surfaces of the display panel 100. In an exemplary embodiment, the adhesive 605 may directly contact side surfaces of a first substrate 110 of the display panel 100. In this case, the adhesive 605 may be coated on sides of the display panel 100. In addition, the adhesive 605 may protrude a certain distance from a plane formed by a side surface of the display panel 100 and an outer surface of one of the sidewalls 225 which corresponds to the side surface of the display panel 100 toward the outside of the display panel. Assuming that a distance by which the adhesive 605 protrudes is a lateral thickness of the adhesive 605, the lateral thickness of the adhesive 605 may be designed to be a minimum thickness that does not cause cohesive fracture and is seen as little as possible when a plurality of display devices are connected to each other.

In such an embodiment, not only a contact area between the adhesive 605 and the sidewalls 225 but also a contact area between the adhesive 605 and the display panel 100 may be increased, thereby further improving the durability of the display device. In addition, since the side surfaces of the display panel 100 and the sidewalls 225 are coated with the adhesive 605, the display panel 100 can be protected from external impact.

Embodiments of FIG. 4 to FIG. 9 may include the adhesive as illustrated in FIG. 10.

Figure 11:
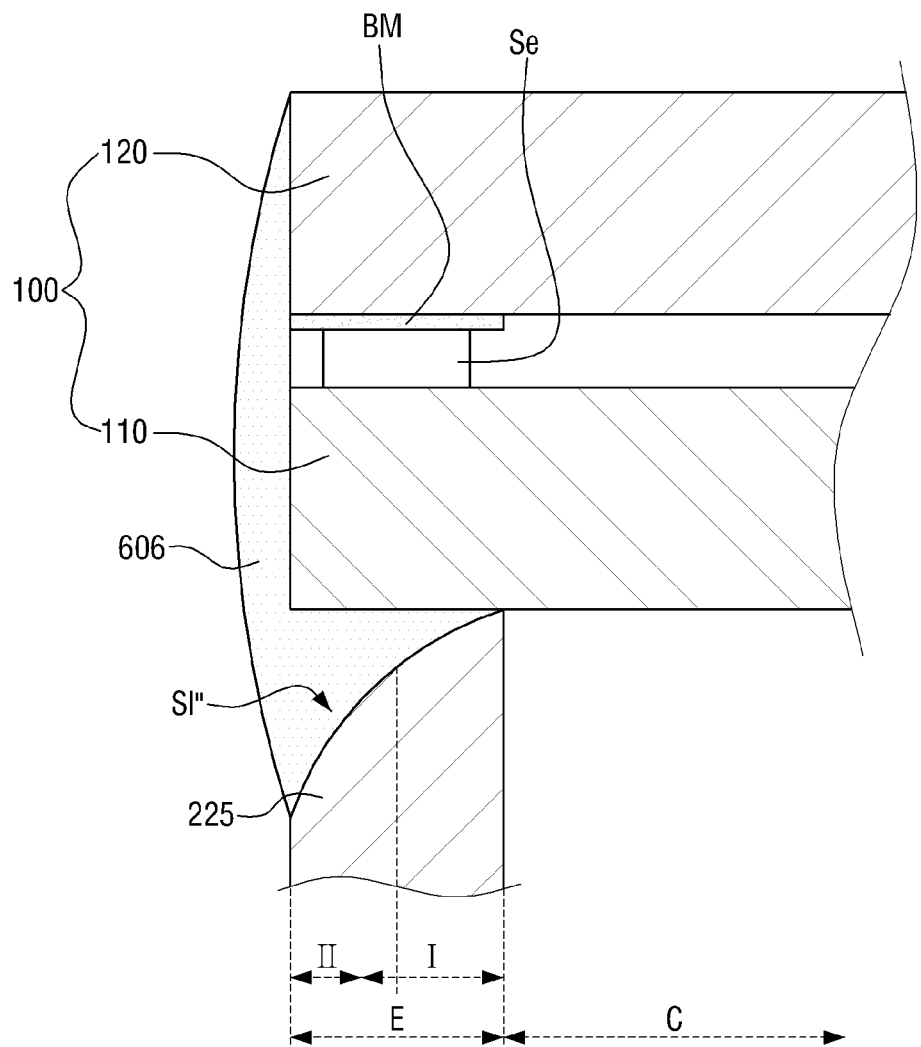

Referring to FIG. 11, an adhesive 606 may extend from between a display panel 100 and a plurality of sidewalls 225 to cover the entire side surfaces of the display panel 100. In an exemplary embodiment, the adhesive 606 may directly contact side surfaces of a first substrate 110 and side surfaces of a second substrate 120 included in the display panel 100. Embodiments of FIG. 4 to FIG. 9 may include the adhesive as illustrated in FIG. 10.

Figure 12:
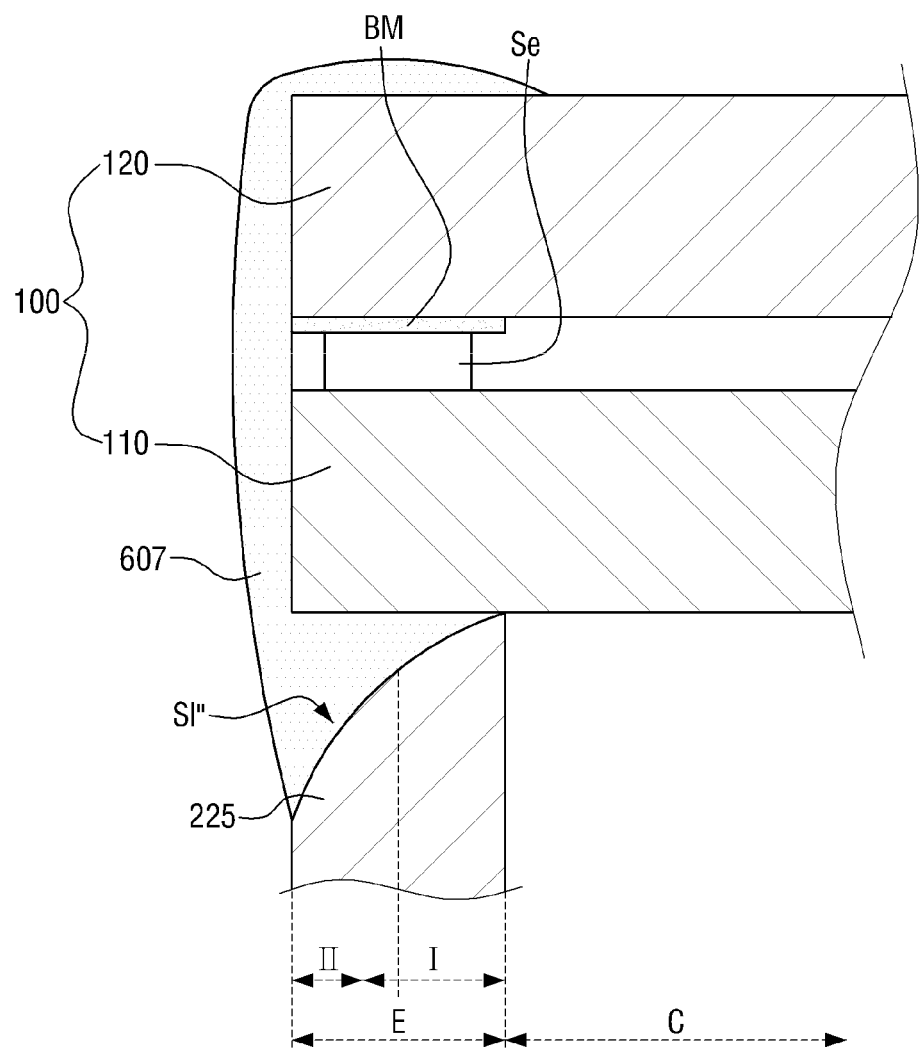

Referring to FIG. 12, an adhesive 607 may extend from side surfaces of a display panel 100 to cover at least part of a top surface of the display panel 100. Here, the adhesive 607 located on the top surface of the display panel 100 may be located only on an edge portion of the display panel 100. That is, the adhesive 607 located on the top surface of the display panel 100 may not intrude into a display region of the display panel 100. Embodiments of FIG. 4 to FIG. 9 may include the adhesive as illustrated in FIG. 10.

Figure 13:
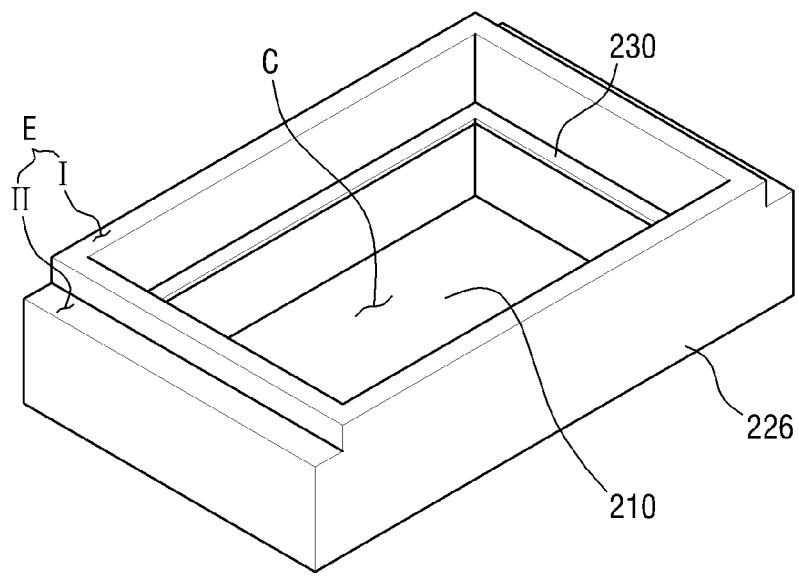
FIG. 13 is a perspective view of a housing of a display device according to another embodiment of the inventive concept.
Figure 14:
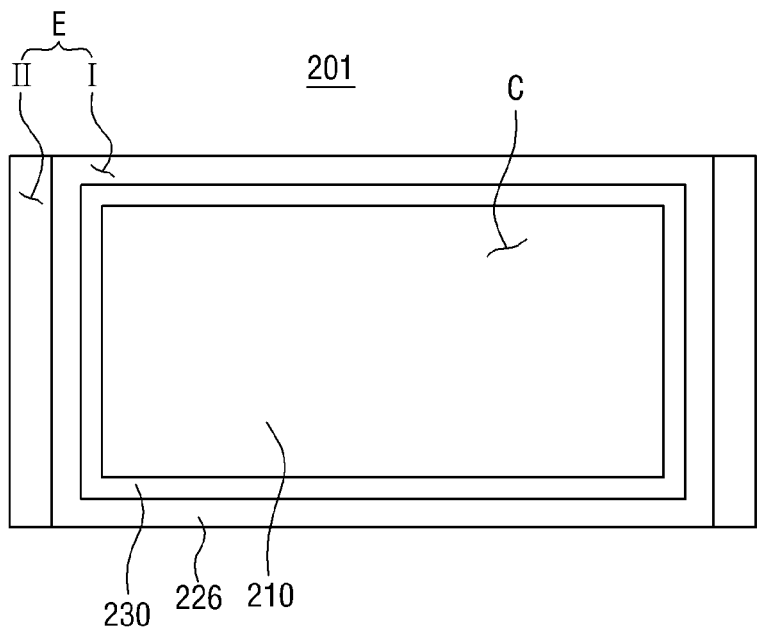
FIG. 14 is a plan view of the housing of FIG. 13.

In the foregoing embodiments, the shape of an inner part of the sidewall and the shape of an outer part of the sidewall may be reversed. FIG. 13 is a perspective view of a housing 201 of a display device according to another embodiment of the inventive concept. FIG. 14 is a plan view of the housing 201 of FIG. 13. For simplicity, elements substantially identical to those of the above-described drawings are indicated by like reference numerals, and thus a redundant description thereof will be omitted.

Referring to FIGS. 13 and 14, respective ends of only some of a plurality of sidewalls 226 may be patterned. In an exemplary embodiment, a second region II may be located only in portions of an edge region E of the housing 201 which correspond to two short sides of a surface of a bottom plate 210. Specifically, a first region I may be located in the entire edge region E of the housing 201, that is, in inner portions of the edge region E which correspond to two short sides of the surface of the bottom plate 210 and portions of the edge region E which correspond to two long sides of the surface of the bottom plate 210. On the other hand, the second region II may be located only in portions of the edge region E which correspond to two short sides of the surface of the bottom plate 210. Accordingly, the sidewalls 226 may have a different shape from those described above.

Although not illustrated in the drawings, a polarizer may be attached onto a display panel 100. The polarizer may be contracted due to a change of the outside environment, and the contraction of the polarizer may bend the display panel 100. Here, two long sides of a surface of the display panel 100 may generally bend, but two short sides of the surface of the display panel 100 may not bend. In addition, the display panel 100 may bulge in a direction in which a light source 300 is located. In other words, the display panel 100 may bend such that it can be seen as concave by a viewer.

Accordingly, the display panel 100 tends to be separated from sidewalls 226 corresponding to two short sides of the surface of the bottom plate 210. To prevent the separation of the display panel 100 from the sidewalls 226, the respective ends of the sidewalls 226 corresponding to the two short sides of the surface of the bottom plate 210 may be patterned. This can increase the contact area between an adhesive (not shown) and the sidewalls 226 corresponding to the two short sides of the surface of the bottom plate 210.

Respective ends of sidewalls 226 corresponding to two long sides of the surface of the bottom plate 210 may not be patterned.

Figure 15:
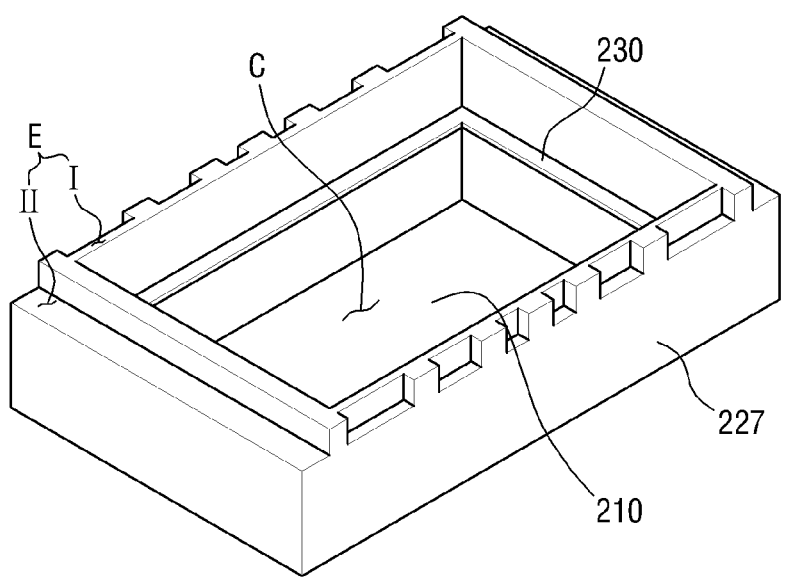
FIG. 15 is a perspective view of a housing of a display device according to another embodiment of the inventive concept.
Figure 16:
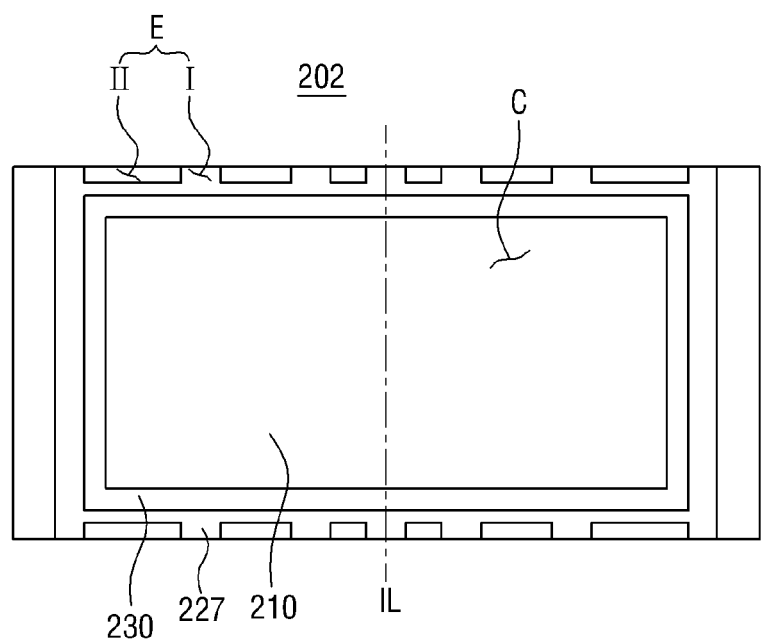
FIG. 16 is a plan view of the housing of FIG. 15.

FIG. 15 is a perspective view of a housing 202 of a display device according to another embodiment of the inventive concept. FIG. 16 is a plan view of the housing 202 of FIG. 15. For simplicity, elements substantially identical to those of the above-described drawings are indicated by like reference numerals, and thus a redundant description thereof will be omitted.

Referring to FIGS. 15 and 16, a ratio of a second region II to a first region I in an edge region E may increase as the distance from a virtual line IL that halves two long sides of a bottom plate 210 increases. Accordingly, a plurality of sidewalls 227 may have a different shape from those described above.

As described above, when a display panel 100 bends, a force with which the display panel 100 is separated from the sidewalls 227 increases as the distance from the virtual line IL that halves the two long sides of the bottom plate 210 increases. Therefore, a housing 202 may be structured as illustrated in FIGS. 15 and 16 in order to stably fix the display panel 100 and the sidewalls 227 each other.

Figure 17:
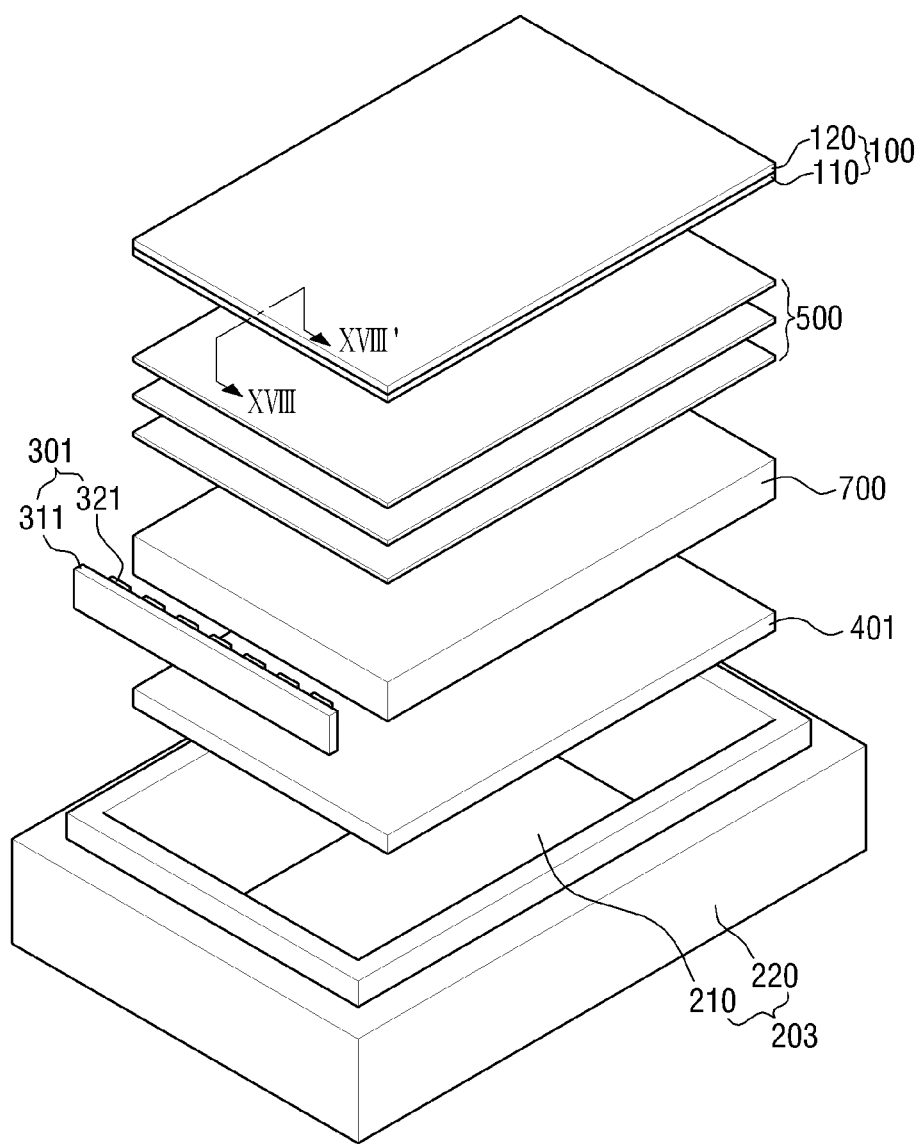
FIG. 17 is an exploded perspective view of a display device according to another embodiment of the inventive concept.
Figure 18:
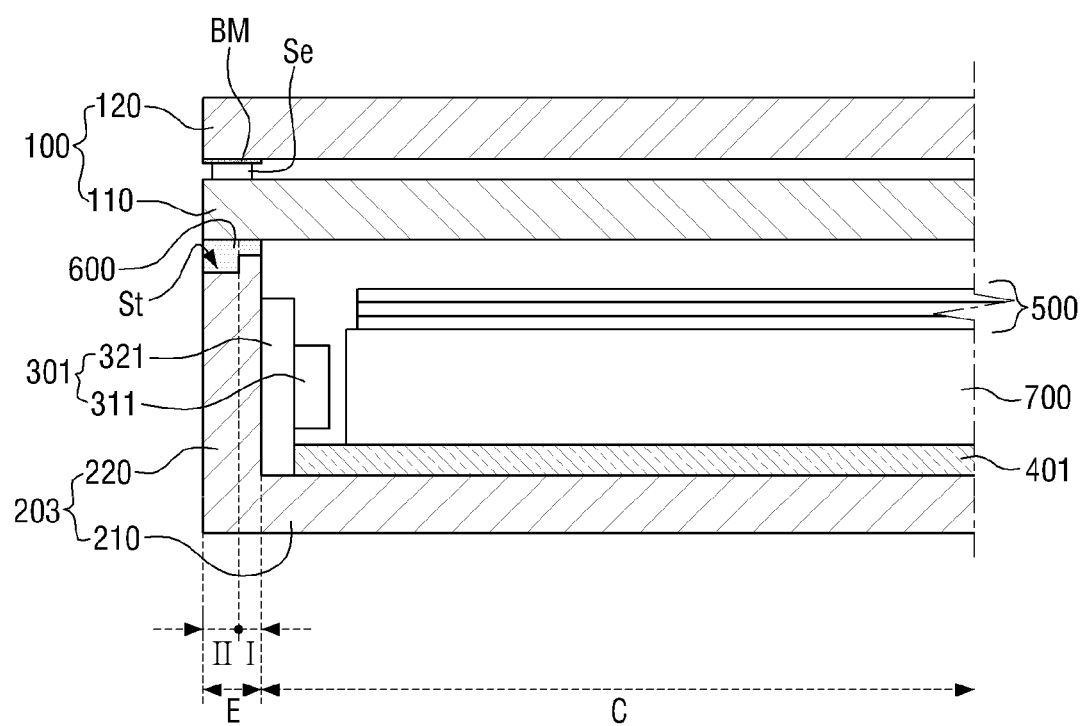
FIG. 18 is a cross-sectional view taken along the line XVIII-XVIII' of FIG. 17.

FIG. 17 is an exploded perspective view of a display device according to another embodiment of the inventive concept. FIG. 18 is a cross-sectional view taken along the line XVIII-XVIII' of FIG. 17. For simplicity, elements substantially identical to those of the above-described drawings are indicated by like reference numerals, and thus a redundant description thereof will be omitted.

Referring to FIGS. 17 and 18, the display device according to the current embodiment may use an edge-type backlight assembly. Accordingly, a light source unit 301 including a circuit board 311 and a plurality of light sources 321 may be placed on a side surface of a light guide plate (LGP) 700. In addition, a sheet support described above may be omitted from a housing 203, and insertion holes may be omitted from a reflective plate 401. The foregoing embodiments may include the edge-type backlight assembly.

Embodiments of the inventive concept provide at least one of the following advantages.

That is, it is possible to provide a display device having a minimized non-display region and improved durability.

However, the effects of the inventive concept are not restricted to the one set forth herein. The above and other effects of the inventive concept will become more apparent to one of daily skill in the art to which the inventive concept pertains by referencing the claims.

Although the exemplary embodiments of the inventive concept have been disclosed for illustrative purposes, the embodiments are only exemplified, but do not limit the inventive concept. Those skilled in the art will appreciate that various modifications and applications are possible, without departing from the scope and spirit of the inventive concept as disclosed in the accompanying claims. For example, each element specified in embodiments of the inventive concept can be variously modified and implemented. Further, differences related to such modifications and applications should be interpreted as being included in the scope of the inventive concept defined by the accompanying claims.

What is claimed is:
1. A display device comprising:
a display panel which displays an image; and
a housing which supports the display panel, wherein the housing comprises:

a bottom plate which comprises an edge region having a first region and a second region adjacent to the first region; and a plurality of sidewalls which are located on the edge region of the bottom plate and face the display panel, wherein the sidewalls overlap an edge portion of the display panel, wherein an average height of at least one of the sidewalls on the first region is greater than an average height of at least one of the sidewalls on the second region, wherein the display panel is disposed on a top side of the sidewalls, and wherein a side surface of the display panel and an outer surface of one of the sidewalls which corresponds to the side surface of the display panel lie in the same plane.

2. The display device of claim 1, wherein an end of each of the sidewalls comprises at least one of a step, a groove, and a slope.

3. The display device of claim 1, further comprising an adhesive which is interposed between the display panel and the sidewalls, wherein the adhesive overlaps the edge portion of the display panel.

4. The display device of claim 3, wherein the adhesive has a photocurable or thermosetting property.

5. The display device of claim 3, wherein the adhesive covers at least part of side surfaces of the display panel.

6. The display device of claim 5, wherein the adhesive extends from the side surfaces of the display panel to cover at least part of a top surface of the display panel.

7. The display device of claim 1, wherein the first region is located in an inner portion of the edge region, and the second region is located in an outer portion of the edge region.

8. The display device of claim 1, wherein the bottom plate has a rectangular shape and the second region is located on two short sides-of the bottom plate.

9. The display device of claim 1, wherein the bottom plate has a rectangular shape which has two long sides and two short sides, the second region includes a plurality of second regions, and a length of the second region disposed close to a corner at which a long side and a short side meet each other is longer than that disposed far from the corner.

10. The display device of claim 1, further comprising a light source which provides light to the display panel, wherein the light source is accommodated in the housing.

11. The display device of claim 10, wherein the display panel comprises a light-blocking layer which blocks light, and wherein the light-blocking layer is located on the edge portion of the display panel which overlaps the sidewalls.

12. The display device of claim 1, wherein the a sealant is interposed between edges of the first substrate and edges of the second substrates, and wherein the sidewalls overlap the sealant.

13. A display device comprising:

a display panel which displays an image; and a housing which supports the display panel, wherein the housing comprises:

a bottom plate which comprises an edge region; and a plurality of sidewalls which are located on the edge region of the bottom plate and faces the display panel, wherein the sidewalls overlap an edge portion of the display panel, and an end of each of the sidewalls comprises at least one of a step, a groove, and a slope, wherein the display panel is disposed on a top side of the sidewalls, and wherein a side surface of the display panel and an outer surface of one of the sidewalls which corresponds to the side surface of the display panel lie in the same plane.

14. The display device of claim 13, wherein the edge region comprises a first region and a second region adjacent to the first region, and an average height of at least one of the sidewalls on the first region is greater than an average height of at least one of the sidewalls on the second region.

15. The display device of claim 14, wherein the first region is located in an inner portion of the edge region, and the second region is located in an outer portion of the edge region.

16. The display device of claim 13, further comprising an adhesive which is interposed between the display panel and the sidewalls, wherein the adhesive overlaps the edge portion of the display panel.

17. A display device comprising:

a display panel which displays an image;

a housing which comprises a bottom plate located under the display panel and a plurality of sidewalls extending from an edge portion of the bottom plate toward the display panel; and an adhesive which is interposed between the display panel and the sidewalls, wherein the adhesive covers at least part of side surfaces of the display panel, and wherein the adhesive is in contact with the at least part of the side surfaces of the display panel.

18. The display device of claim 17, wherein an end of each of the sidewalls comprises at least one of a step, a groove, and a slope.

19. The display device of claim 17, wherein the adhesive extends from the side surfaces of the display panel to cover at least part of a top surface of the display panel.

* * * * *